United States Patent [19]

Pournain et al.

[11] Patent Number: 4,987,317
[45] Date of Patent: Jan. 22, 1991

[54] SYSTEM FOR PUTTING ELECTRONIC UNITS CONNECTED TO A COMMUNICATIONS CHANNEL INTO AN OPERATIONAL STATE OR INTO A STAND BY STATE

[75] Inventors: Michel A. Pournain, Leguevin; Jean-Pierre A. Loncle, Muret; Francis J. Colombie, Toulouse, all of France

[73] Assignee: Siemens-Bendix Automotive Electronics, Toulouse, France

[21] Appl. No.: 303,869

[22] Filed: Jan. 30, 1989

[30] Foreign Application Priority Data

Feb. 5, 1988 [FR] France .................................. 88 01330

[51] Int. Cl.[5] .......................... H04B 1/16; G06F 1/00
[52] U.S. Cl. ...................................... 307/40; 364/707; 455/343; 307/38
[58] Field of Search ....................... 307/9.1, 10.1, 10.7, 307/31, 33, 34, 38, 40, 39; 340/310 R, 310 A, 310 CP, 825.06, 825.07, 825.22, 825.76; 364/424.01, 424.05, 707; 455/343

[56] References Cited

U.S. PATENT DOCUMENTS 4,661,718 4/1987 Matsumoto et al. ................ 307/10.1
4,780,620 10/1988 Högburg et al. .................... 307/10.1
4,839,530 6/1989 Greenwood ........................ 307/10.1

Primary Examiner—A. D. Pellinen
Assistant Examiner—David Osborn
Attorney, Agent, or Firm—Russel C. Wells; George L. Boller

[57] ABSTRACT

In this system, the units are capable of transmitting and/or of receiving messages in at least a first format by way of a channel (A). Circuitry included in at least one of these units (B, M) are provided for transmitting on the channel (A), in a second format distinct from the first format, a message for putting the other electronic units (M) into operation. Each unit (M) comprises first circuit (102) for interpreting the messages in the second format in order to command the switching on of at least a portion (200, 202; 300, 302) of the circuits of this unit, second circuit (202); (302) for interpreting the messages in the first format in order to command the switching off or to confirm the switching on of at least a portion (200, 202; 300, 302) of the circuits of unit, the second interpretation circuit being part of the circuits whose switching on is controlled by the first interpretation circuit, and a circuit (101) for supplying the first interpretation means (102) independently from the messages transmitted on the communications channel (a).

8 Claims, 3 Drawing Sheets

FIG.:1

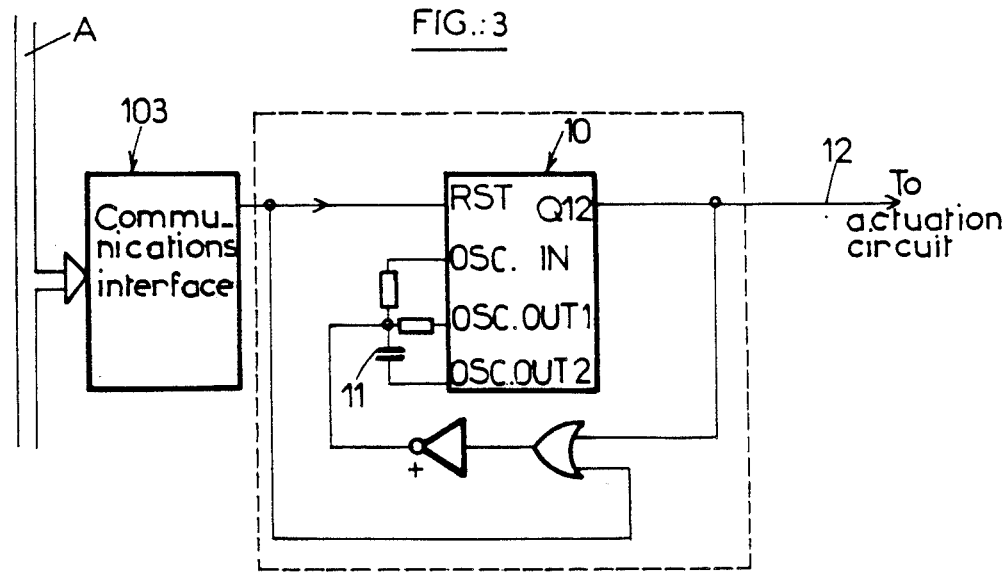
FIG.:3
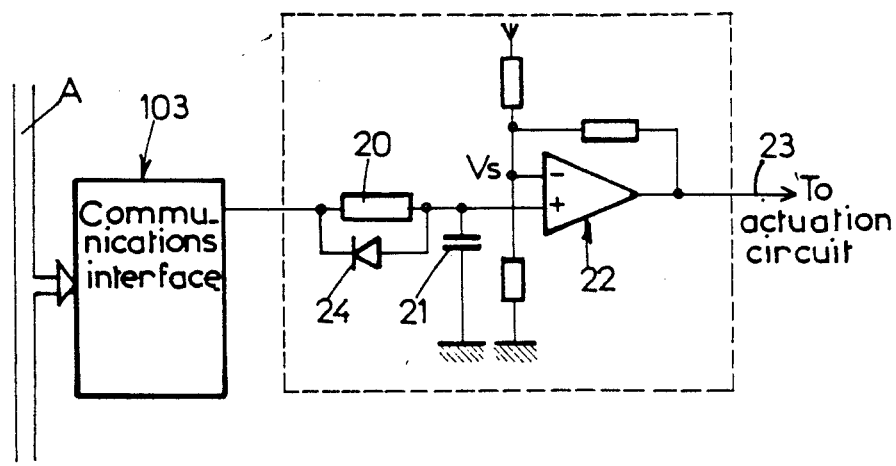
FIG.:4

SYSTEM FOR PUTTING ELECTRONIC UNITS CONNECTED TO A COMMUNICATIONS CHANNEL INTO AN OPERATIONAL STATE OR INTO A STAND BY STATE

BRIEF SUMMARY OF INVENTION

The invention relates to a system which enables electronic units, capable of transmitting and/or receiving messages by means of a communications channel, to change from a standby state to an operational state and vice versa by the interpretation of specific messages.

In such a multiplexing system, the electronic units connected to each other by the communications channel must usually be independently and permanently connected to an electrical supply for security and availability reasons.

One of the major requirements, during the operation of such a system on an accumulator, is to obtain a low electrical consumption during rest periods. Such is the case in the field of motor vehicles equipped with a multiplexing system where electronic units connected to a communications channel on which actuating, measurement and test messages etc. flow, are associated with a certain number of electrical devices such as actuators, transducers, sensors, computers or other things.

Now, certain of these devices (monitoring unit, horn, headlights, hazard lights, etc.) must be able to be operated when the vehicle ignition is off, while others can remain non-operational. It is therefore advantageous to put the electronic units which are not necessary at a given moment into a standby state in order to minimize the electrical consumption of the vehicle at rest.

This raises the problem of the selective 'awakening' of a certain number of electronic units.

The U.S. Pat. No. 4,661,718 proposes a solution consisting in providing a double control channel for the devices which must become operational even when the ignition is off; the first channel, constituted by the communications channel and the corresponding electronic unit, is active when the ignition is on and is inactive in the opposite case; the second channel is active when the ignition is off and comprises circuits having a lower electrical consumption than the first communications channel.

The solution described in this U.S. Pat. No. 4,661,718 effectively enables a reduction in electrical consumption in the rest state, but it is not however satisfactory insofar as it requires specific wiring and circuits for the devices concerned, while one of the principal objects of a system of the abovementioned type is precisely to simplify and reduce the wiring made necessary by the large number of electrical devices which are encountered on modern motor vehicles.

This solution is also in opposition to the standardization, which is essential in this type of system, of the electronic units which are associated with the various devices.

Finally, as a corollary to the above, this solution does not offer vehicle designers the desired flexibility as the hardware configuration of the system depends on the functions which the latter must perform.

The invention aims at overcoming the disadvantages of the known solutions by providing a system in which the putting of electronic units into the operational state or into the standby state is carried out by means of the communications channel to which these units are connected.

For this purpose, the object of the invention is a system for putting electronic units, capable of transmitting or receiving messages in at least a first format by means of a communications channel, into an operational state or into a standby state, characterized in that the system comprises means of transmitting on the communications channel, in a second format which is distinct from the first format, a message for putting the said units into an operational state, and in that each unit comprises 1-first means for interpretinq the messages transmitted in the said second format in order to at least command the switching on of at least a portion of the circuits of the said unit in response to the recognition of the said message for putting into the operational state, 2- second means for interpreting the messages transmitted in the said first format in order to command at least the switching off of at least a portion of the circuits of the said unit in response to the recognition of a message for the switching off of this portion of the circuits transmitted in the said first format, the said second interpretation means being part of the circuits whose switching on is commanded by the said first interpretation means, and 3- a circuit for supplying the said first interpretation means independently from the messages transmitted on the said communications channel.

Thus, the units have two states, namely an operational state in which a minimum of electronic circuits of the units are switched on and in which the units are capable of transmitting and/or receiving messages in the first format, and a standby state in which only the circuits having a low electrical consumption, whose purpose is to switch on other electronic circuits of the electronic unit in response to the reception of a message for putting into the operational state transmitted in the second format, are kept switched on.

According to one feature, the said second interpretation means comprise means of timing started when they are switched on for commanding the switching off of the circuits previously switched on, in the absence within a predetermined period of a message confirming the switching on. This feature enables, on the one hand, a strengthening of the operational security by confirming, by means of a message which is rich in information (first format), the initial switch-on message transmitted in the second format which is relatively poor in information, and on the other hand, if necessary, a selective maintaining of the various electronic circuits of the various electronic units under power.

According to another feature each electronic unit comprises:

a) a first subassembly of a first type comprising at least:

a communications interface with the said transmission channel, a first circuit for the interpretation of messages transmitted in the said second format which is connected to the said interface, the said supply circuit for supplying the said interface and the first interpretation circuit independently from the messages transmitted on the said channel, b) at least one second subassembly of a second type comprising at least:

a second circuit for the interpretation of the messages transmitted in the said first format which is connected to the said interface, a second supply circuit for the circuits of the second subassembly, a circuit for actuating the second supply circuit controlled by the first interpretation circuit for switching on the circuits of the second subassembly in response to the reception by the first interpretation circuit of a message for putting into the operational state transmitted in the said second format, a circuit for deactuating the second supply circuit controlled by the second interpretation circuit in order to switch off the circuits of the second subassembly, either in response to the reception by the second interpretation circuit of a switch-off message transmitted in the said first format, or in the absence of reception by the second interpretation circuit of a switch-on confirmation message within the predetermined period, and at least one functional block supplied by the second supply circuit.

According to one embodiment, at least one of the said electronic units comprises several subassemblies of the second type hierarchized into several levels and each subassembly is:

capable of being switched on by its actuating circuit controlled by at least one interpretation circuit of lower level of the first or of the second type, capable of being selectively maintained under power on reception by its interpretation circuit of a command or of a switch-on confirmation message transmitted in the said first format, and capable of being switched off, either when the said command or the said switch-on confirmation message has not been received by its interpretation circuit within a predetermined period T after its switching on, or on reception by this same interpretation circuit of a command or of a switch-off message transmitted in the said first format.

According to another embodiment, at least one of the interpretation circuits of level x is connected in parallel with several actuating circuits of subassemblies of level y, immediately higher than x.

According to yet another embodiment, at least one electronic unit comprises an internal communications bus to which the interpretation circuits and the communications interface are connected and on which the messages transmitted in the said first format flow.

Preferably, the said interpretation circuits are adapted to transmit messages in the said first and second formats.

According to a particular embodiment in which the communications channel is capable of successively assuming a state of rest and at least one active state and the messages of the first format are constituted from at least one word defined by a succession of channel states, characterized in that the message for the putting into the operational state of the units of the said second format is constituted by the putting into the active state of the said channel during a time longer than the maximum duration of a series of active states likely to be encountered during the transmission of a message word in the said first format and in that the said first means of interpretation comprises a time metering circuit adapted for detecting the state of the said channel, generating a command to the actuating circuits which are connected to it when the channel remains in the active state for a time longer than a duration which is itself longer than the said maximum duration and cancelling out when the channel changes to the rest state before the end of the said longer duration.

BRIEF DESCRIPTION OF THE DRAWING

Other features and advantages of the invention will appear from the following description of one embodiment given solely by way of example with reference to the appended drawings in which:

FIGS. 3 and 4 are examples of embodiment of the interpretation circuit in "poor" mode of the system shown in FIG. 1.

DETAILED DESCRIPTION

Figure 1:
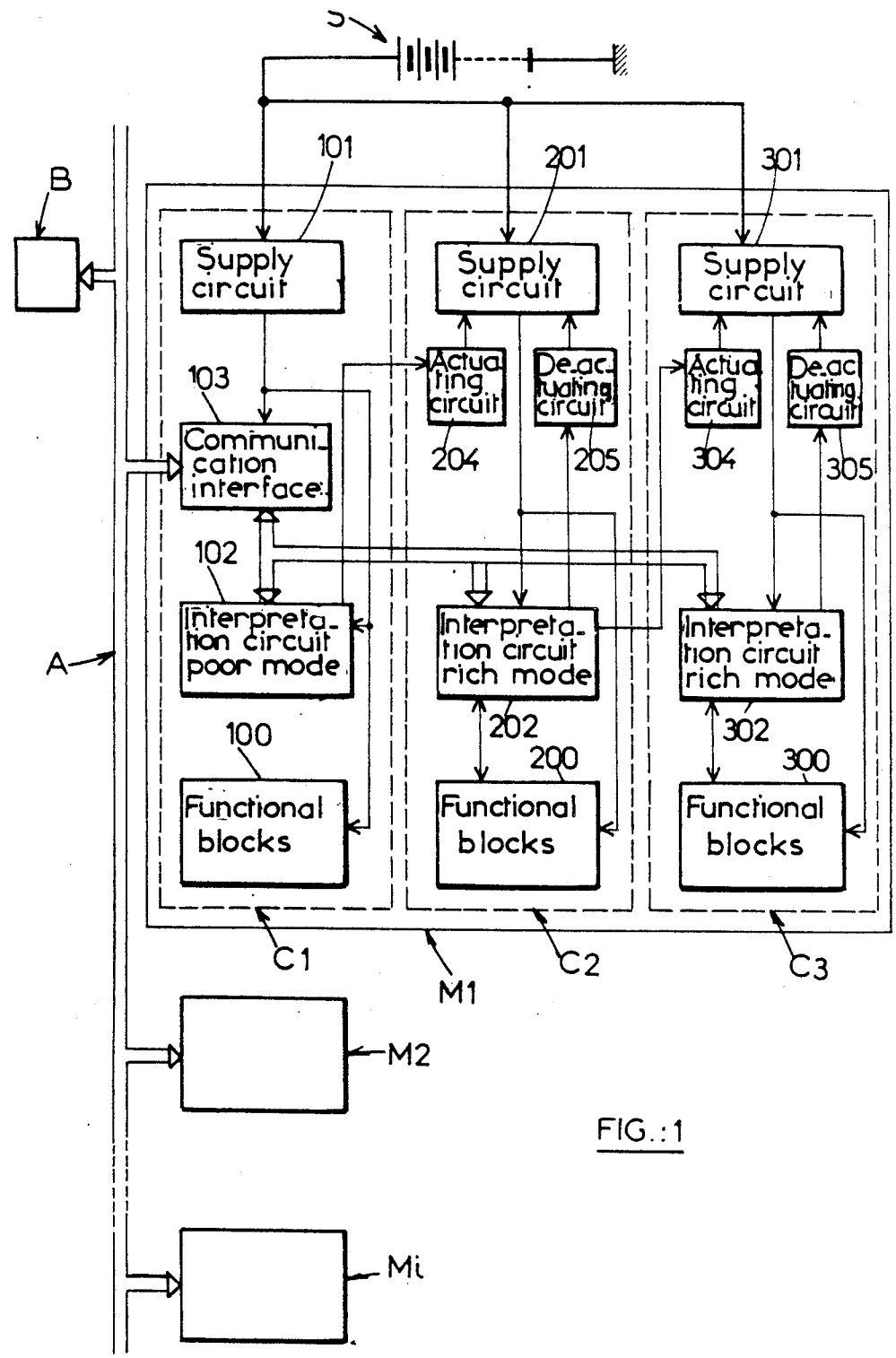
FIG. 1 is a block diagram of a system for putting into the operational state or into the standby state of electronic units connected to a communications channel.

Referring to FIG. 1, the system shown includes a communications channel constituted by a bus A connected to a certain number of electronic units M1, M2...Mi and to an electronic unit B. The unit B and the units M1, M2...Mi are capable of transmitting and/or receiving messages on the bus A.

All the units M have the same internal architecture and, for purposes of clarity, only that of the module M1 has been shown in detail on the drawing. The unit B can be an electronic unit of the same type as M, but which will be the starter of the described system.

Each unit M is constituted by a certain number of subassemblies C. The number of them is not necessarily the same in all of the units M, but each unit M comprises at least one subassembly C1 and one subassembly C2. In the example of FIG. 1, the unit M1 also comprises a third subassembly C3.

These subassemblies are hierarchized into "n" levels according to their functional class:

C1 belongs to a level "1" functional class,

C2 belongs to a level "2" functional class,

C3 belongs to a level "3" functional class, etc.

The subassemblies of levels "2" to "n" each comprise one or more functional blocks: C2 comprises functional blocks 200, C3 comprises functional blocks 300, etc. The subassembly C1, whose function will be explained in more detail below, may or may not comprise functional blocks 100.

The functional blocks 100, 200, 300 represent electrical energy consuming circuits associated with devices such as actuators, transducers, sensors, etc. All of the functional blocks of the various units having similar characteristics belong to a functional class of the same level: it can be a matter of functional blocks having similar electrical consumptions or whose use, not continuous, is simultaneous or synchronized.

Each subassembly C1, C2, C3...Cn also comprises a supply circuit 101, 201, 301... connected to an electrical energy source S and respectively supplying an interpretation circuit 102, 202, 302... and the corresponding functional blocks 100, 200, 300....

The subassembly C1 comprises a communications interface 103 between the bus A and the interpretation circuit 102. The interface 103 is supplied by the supply circuit 101. Depending on the input/output interconnection mode of the various circuits inside the units M, the interpretation circuits 202, 302... can be connected in parallel to the communications interface 103 as shown in FIG. 1, be connected in cascade (outputs of the circuit 102 connected to the inputs of the circuit 202, outputs of the circuit 202 connected to the inputs of the circuit 302, etc.) or connected in any other appropriate manner.

The supply circuits 101, 201, 301... are connected to an electrical energy source such as an accumulator. When the electrical energy source is active, the supply circuit 101 continuously supplies the interface 103, the interpretation circuit 102 and, if necessary, the functional blocks 100. Conventional means such as switches, relays or other means (not shown) can possibly be provided for disconnecting the electrical energy source S and interrupting the supply of the abovementioned circuits. However, this is an exceptional case and in the following text it will be accepted that the circuits of the subassembly C1 are continuously supplied, including while the units are put into the standby state. This is the reason these circuits are chosen such that they have a very low electrical consumption.

The supply circuits 201, 301... of the subassemblies of functional classes of higher level are associated with actuating circuits 201, 304... and de-actuating circuits 205, 305....

Each actuating circuit is controlled by the interpretation circuit of lower level: the interpretation circuit 102 controls the actuating circuit 204, the interpretation circuit 202 controls the actuating circuit 304, etc.. Each de-actuating circuit is controlled by the interpretation circuit of the same level: the interpretation circuit 202 controls the de-actuating circuit 205, the interpretation circuit 302 controls the de-actuating circuit 305, etc.. Depending on whether it is actuated or de-actuated, each of the supply circuits 201, 301... supplies or does not supply the interpretation circuit and the functional blocks of the subassembly C2, C3... to which it belongs.

The actuation (putting into the operational state) and the de-actuation (putting into the standby state) of the electronic units M are carried out by the transmission of specific messages in the communications channel or bus A. The latter has at least two different states of which one will be called the inactive state and the others the active states.

Within the scope of the described system, the messages transmitted on the bus A can appear in at least two separate forms: a normal first format, or rich mode, in which the transmitted messages can only be recognized by the interpretation circuits 202, 302... having functional classes higher than "1" and a second format, or poor mode, in which the messages, which contain less information, can at least be recognized by the interpretation circuits 102 having a level "1" functional class.

According to a preferred embodiment, the first and second formats are distinguished from each other by the length of the words transmitted in each format. It is known in fact that the waveforms present on a communications bus can be defined by their type of modulation (definition of the different states of the bus A), the modulation frequency and the maximum length of the words transmitted without a change of state. This maximum length combined with the modulation frequency gives the minimum frequency Fm for which it is certain to have a change of state of the bus in this first format.

At the modulation frequency which is that of the described system, the messages transmitted in the first format or normal mode are constituted by one or more words which have a maximum length or duration of tmax. This duration tmax represents the maximum time during which the bus A can remain in active states, without changing to the inactive state, during the transmission of a message in this first format.

A message transmitted in the second format or "poor" mode is characterized by the fact that its modulation frequency is lower than the minimum frequency Fm of the normal mode. In other words, in this second format, the bus A is forced to an active state for a minimum duration which is longer than the longest duration tmax of a message word in the first format. This time tmin, which is longer than tmax, must also be sufficiently long to enable the establishment of the startup conditions of the electronic units of the subassemblies of class higher than 1 and to guarantee good noise immunity. If ts is this additional time, then:

$$tmin = tmax + ts$$

Consequently, the normal first format or rich mode enables, at a high data rate, the transmission of numerous different messages with all the redundancies necessary and sufficient for good interpretation reliability. The interpretation of the messages in this format necessitates electronic circuits 202, 302... which, even though conventional and known to those skilled in the art, are complex and high consumers of electrical energy (microprocessors, specific circuits or others).

The second format or poor mode enables the delivery of only one or a few different messages, but the latter can easily be analysed by a very simple interpretation circuit 102 which therefore does not consume much energy.

As shown in FIG. 3, it can, for example, be a counter 10 which is incremented when the bus A is in an active state and of which the capacity of the associated capacitor 11 is chosen such that it overflows when a time longer than tinit has been reached (tmax < tinit < tmin) and emits on its output 12 a pulse applied to one or more actuating circuits. When the time tinit has not been reached and when the bus A returns to the rest state, the content of the counter is reinitialized.

It is also possible to use (FIG. 4) an RC circuit having a resistor 20 and a capacitor 21 connected to a threshold comparator 22 which compares the voltage at the terminals of the RC circuit with a threshold voltage Vs. When the bus A is in the active state, the capacitor 21 charges up through the resistor 20 and, if the voltage Vs is reached at its terminals, the comparator 22 emits an output pulse on its output 23. When the bus A is in the inactive state, the capacitor 21 discharges through a diode 24 which shunts the resistor 20.

It is also possible to use for the interpretation circuit 102 a logic circuit having flip-flops, a relay timed on energization or on tripping and, in general, any electrical or electronic time metering circuit capable of changing state when the bus remains in an active state for a duration longer than tinit and to return to its initial state when the bus returns to the inactive state no matter what the duration may be.

Figure 2:
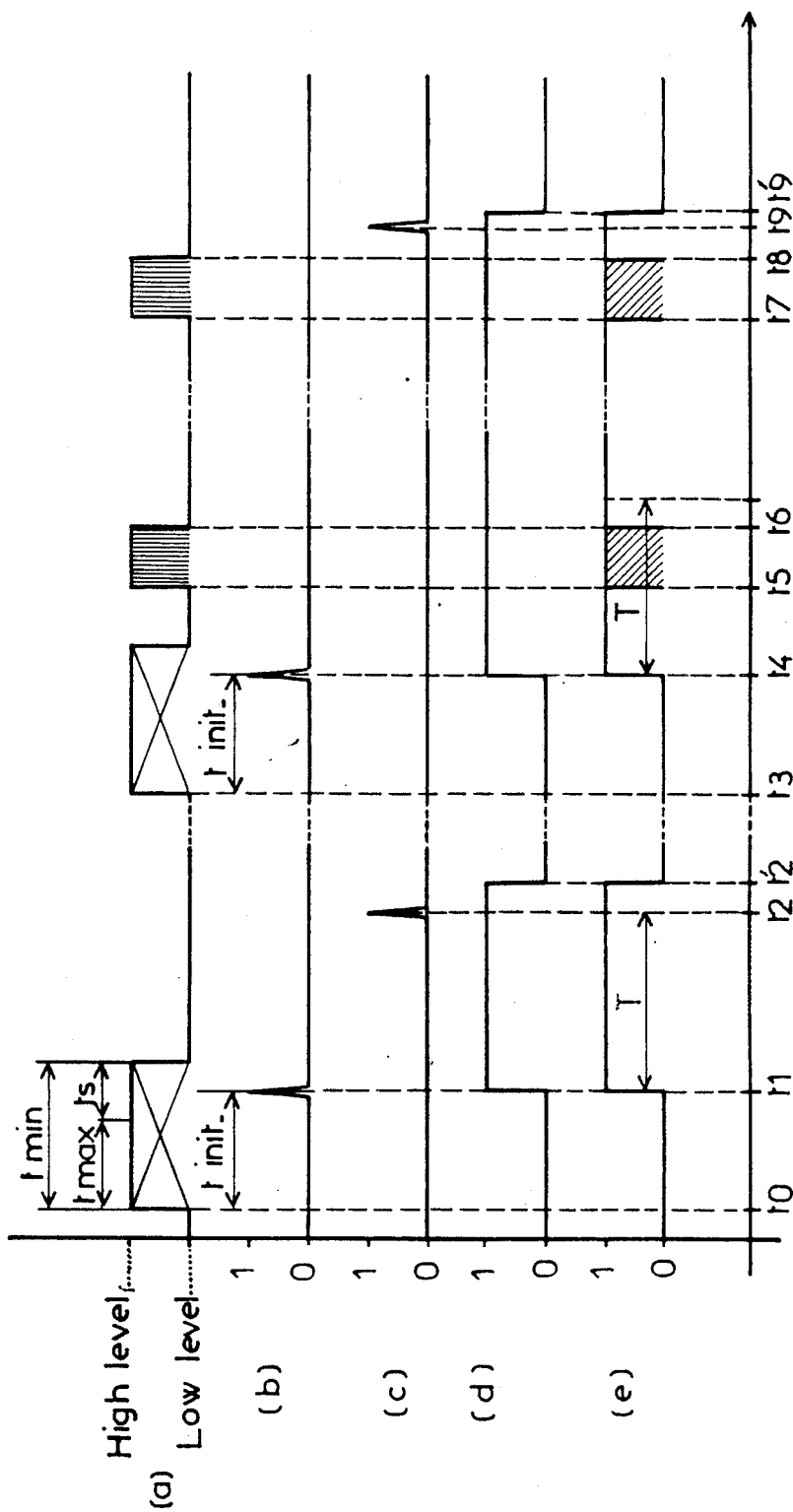
FIG. 2 is a timing diagram illustrating the functioning of the system, shown in FIG. 1.

The functioning of the system in FIG. 1 will now be described with reference to the timing diagram in FIG. 2, assuming that all of the units M are initially in the standby state. In this state, only the circuits 100, 102 and 103 of the subassembly C1 of each unit are supplied by their respective circuit 101. The consumption of these units is therefore very low. It will also be assumed that each unit M comprises only the class C1 subassembly and one class C2 subassembly whose actuating circuit 204 will be controlled by the interpretation circuit 102.

At the instant to (FIG. 2a) a message for putting into the operational state is transmitted in the second format on the bus A, for example by the unit B. In the case in which the system is installed in a motor vehicle, this unit B could be, for example, an electronic unit associated with the vehicle's starter switch. However, the message for putting into the operational state may also be emitted by any of the units M which are in the operational state at the instant to.

At the time to (FIG. 2a), the bus A changes from the rest state (e.g. the low level) to an active state (e.g. the high level) for a duration tmin which is the sum of the duration tmax (corresponding to the maximum length of an elementary rich message word without a change of state of the communications bus A) and of a time ts whose duration is determined to enable the stabilization of the switching on of the class C2 subassembly and to enable these circuits to work.

At the instant t1 such that t1−to=tinit and tmax <tinit<tmin, the interpretation circuits 102 of the units M detect, by means of their respective communications interface circuit 103, the message for putting into the operational state and transmit a command to the actuating circuits 204 which are associated with them (t1, FIG. 2b). The result of this is to actuate the corresponding supply circuits 201 (t1, FIG. 2d). The circuits of the class C2 subassemblies are therefore switched on (all of the units M thus change from the standby state to the operational state) and, among these, the interpretation circuits 202 (t1, FIG. 2e) initialize a delay. The purpose of this delay is to enable the rich mode interpretation circuits 202 to verify, by means of the communications interface, if a switch-on confirmation message, transmitted in rich mode and specifically intended for them, is present on the bus A before the end of a predetermined time T. This delay can be produced by a monostable, by a counter incremented by a clock, by a counting performed by the software if the interpretation circuit is a programmed microprocessor or by any other appropriate conventional means.

At the end of the time T (t2, FIG. 2e), the circuits 202 which have not detected a switch-on confirmation message relating to the subassembly to which they belong, send a command to the de-actuating circuits 205 which are associated with them (t2, FIG. 2c). The corresponding supply circuits 201 are switched off (t'2, FIG. 2d) and the class C2 subassemblies corresponding with them are switched off (t'2, FIG. 2e).

If, on the other hand, within the limits of this time T, one or more of the interpretation circuits 202 detect, by means of the communications interface circuits 103, a switch-on confirmation message transmitted in rich mode and specifically intended for them, then the internal delay in these circuits 202 is de-actuated and the corresponding subassembly will remain under power. This is the situation which is described between the times t3 and t6 in FIG. 2. As before, the initialization of the delay is found at the time t4 (a procedure common to all of the circuits 202 of the system), but between t5 and t6 one of the rich messages present on the bus A is detected by one of the interpretation circuits 202 as a switch-on confirmation message intended for it and the delay in this circuit is therefore de-actuated (t6, FIG. 2e). The corresponding supply 201 is not deactuated and the corresponding class C2 subassembly remains under power and therefore operational (t>6).

The switching off of one or more subassemblies which are then under power will be carried out by sending on the bus A a specific switch-off rich message. This situation is described between the times t7 and t9 in FIG. 2. Between the times t7 and t8 a rich message is sent on the bus A (t7/t8, FIG. 2a). If this message is recognized by an interpretation circuit 202 as a switch-off message for the subassembly to which it belongs, this interpretation circuit 202 sends a command to the deactuating circuit 205 (t9, FIG. 2c). The corresponding supply circuit is then de-actuated (t'9, FIG. 2d) and the circuits of the corresponding subassembly, and therefore the interpretation circuit 202, are switched off (t'9, FIG. 2e).

If one or more electronic units M comprise several subassemblies Cx of level x higher than 1, the interpretation circuit 102 of the subassembly C1 can be connected in parallel to several actuating circuits x04 (x>1) which will ensure the switching on of the corresponding class Cx subassemblies by the supply circuits x01 on recognition of a message for putting into the operational state in poor mode. Each of the associated interpretation circuits x02 will initialize a delay during which it will look for the arrival of a specific switch-on confirmation message sent in rich mode without the presence of which, before the end of the delay T, a command will be sent to the corresponding de-actuating circuit x05. After this, the switching off of the subassemblies of a unit M, and which are now under power, will be carried out either by the sending of a specific switch-off message in rich mode on the bus A by any of the other electronic units which are then in the operational state, or by a specific message, sent on the internal communications bus of the unit M containing the subassembly or subassemblies to be switched off, by any of the subassemblies still under power in this unit M.

As a variant, a hard-wired link or links can be provided between the subassemblies inside a unit M to provide the switch-off and switch-on confirmation messages, for example between the interpretation circuits 202 and 302.

Another variant can be envisaged: in one or more of the units M, one or more interpretation circuits y02 (y>1) can be connected to one or more actuating circuits z04 (z>1). In these different architectures, the switch-on and switch-off confirmation procedures remain the same as before.

Finally, it can also be envisaged that the interpretation circuit of a subassembly of a given class itself decides the switching off of the subassembly to which it belongs (for example when it has completed a task which has been requested of it).

The described system can, among other applications, be applied to motor vehicles for the purpose of limiting the electrical consumption of the electronic units associated with various devices when the vehicle is not being used and when therefore the energy is supplied only by the battery. The system therefore allows the maintaining in the operational state of certain equipment such as, for example, anti-theft devices or remote-controlled vehicle door opening and closing devices (this equipment being controlled either by the functional blocks 100 of the subassemblies C1 of level "1" functional class, or by units having at least one class of level higher than 1 under power). The system also offers the possibility of switching on the subassemblies associated with certain devices (horn, headlights, hazard lights, etc.) and of controlling them by sending appropriate messages.

Furthermore, the system enables, during the functioning of the vehicle, the maintaining in the standby state of subassemblies or units associated with devices which are little used in normal operation, for example devices for the intercommunication of the vehicle with the external world. This again results in a minimal electrical consumption on board the vehicle, as well as an increase in the lifetime of the electronic circuits concerned.

The described system can be used in fields other than motor vehicles, for example that of domestic applications of data processing techniques. Thus such a system can enable the remote control of the switching into the operational state or into the standby state, by means of a telephone line and a modem, of a domestic management microcomputer controlling devices such as heating equipment, a ventilation device, an alarm device, etc.. Similarly, the described system can be used inside a building for the putting into the operational state or into the standby state of electronic units associated with these devices and controlled by the microcomputer.

It follows that the described embodiments are only examples and that they could be modified, particularly by the substitution of equivalent techniques, without by this departing from the scope of the invention.

We claim:

1. In a system for selectively switching electronic units capable of transmitting or receiving messages in at least a first format by means of a communications channel, into an operational state or into a standby state, characterized in that the system comprises means (B, M) of transmitting a message on the communications channel (A), in a second format which is distinct from the first format, for selectively switching the units (M) into an operational state, each unit (M) comprises:
communication interface means (103) operatively connected to the communication channel for transmitting and receiving messages in either the first or second format;
first interpretation means (102) operatively connected to said communication interface means for interpreting said messages transmitted in said second format in order to at least command the switching on of at least a portion (200, 202; 300, 302) of the circuits of the unit in response to the recognition of said message for switching the selected unit into an operational state,
second interpretation means (202; 302) operatively connected to said communication interface means for interpreting the messages transmitted in said first format in order to command at least the switching off of at least a portion (200, 202: 300, 302) of the circuits of said unit in response to the recognition of a message for the switching off of this portion of the circuits transmitted in said first format, said second interpretation means being part of the circuits whose switching on is commanded by said first interpretation means, and
a power supply circuit (101) for supplying power to said first interpretation means (102) independently from the messages transmitted on the communications channel (A).

2. The system according to claim 1, characterized in that said second interpretation means (202, 302) comprises timing means started when they are switched on for commanding the switching off of the circuits (200, 202; 300, 302) previously switched on, in the absence within a predetermined period (T) of a message confirming the switching on.

3. The system according to claim 1 characterized in that each electronic unit (M) comprises:

(a) a first subassembly (C1) of a first type comprising at least:
said communication interface (103) with the transmission channel (A),
said first interpretation means circuit (102) connected to said interface (103) for the interpretation of messages transmitted in said second format,
said power supply circuit (101) for supplying said interface (103) and said first interpretation means circuit (102) independently from the messages transmitted on the transmission channel (A), (b) at least one second subassembly (C2) of a second type comprising at least:
said second interpretation means circuit (202) connected to said interface (103) for the interpretation of the messages transmitted in said first format,
a second power supply circuit (201),
at least one functional block (200) supplied by said second supply circuit (201)
an actuating circuit (204) for actuating said second power supply circuit (201), said actuating circuit controlled by said first interpretation means circuit (102) for switching on the circuits (200) of said second subassembly in response to the reception by the first interpretation means circuit of a message transmitted in said second format,
a de-actuating circuit (205) controlled by the second interpretation means circuit (202) for de-actuating said second power supply circuit in order to switch off the circuits (200,202) of the second subassembly (C2), either in response to the reception by said second interpretation means circuit (202) of a switch-off message transmitted in said first format, or in the absence of reception by the second interpretation means circuit (202) of a switch-on confirmation message within said predetermined period, and
at least one functional block (200) supplied by said second power supply circuit (201).

4. The system according to claim 3, characterized in that at least one of the electronic units comprises several subassemblies (C2, C3...) of the second type heirarchized into several levels (x) and each subassembly (Cx) is:
capable of being switched on by its actuating circuit (x04) controled by at least one interpretation means circuit (y02) of lower lever (Cy) of the first or of the second type of said subassemblies,
capable of being selectively maintained under power on reception by its interpretation circuit (x02) of a command or of a switch-on confirmation message transmitted in the first format, and
capable of being switched off, either when a command or a switch-on confirmation message has not been received by its interpretation means circuit (x02) within a predetermined period (T) after its switching on, or on reception by its interpretation means circuit (x02) of a command or of a switch-off message transmitted in the first format.

5. The system according to claim 4, characterized in that at least one of said interpretation circuits (x02) of level x is connected in parallel with several actuating circuits (y02) of subassemblies (Cy) of level y, immediately higher than x.

6. The system according to claim 5, characterized in that at least one electronic unit (M) comprises an internal communications bus to which said interpretation means circuits (x02) and said communications interface (103) are connected and on which the messages transmitted in the said first format flow.

7. The system according to claim 6, characterized in that said interpretation means circuits (x02) are adapted to transmit messages in said first and second formats.

8. The system according to claim 1, in which the communications channel is capable of successively assuming a state of rest and at least one active state and the messages of the first format are constituted from at least one word defined by a succession of channel states, characterized in that the message for the putting into the operational state of the units of said second format is constituted by the putting into the active state of the channel during a time longer than the maximum duration (tmax) of a series of active states likely to be encountered during the transmission of a message word in the first format and in that said first interpretation means (102) comprises:
    a time metering circuit adapted for detecting the state of the channel, generating a command to said actuating circuits which are connected to it when the channel remains in the active state for a time longer than a duration (tinit) which is itself longer than said maximum duration (tmax) and cancelling out when the channel changes to the rest stated before the end of said longer duration (tinit).

* * * * *